Jan. 4, 1944.　　　W. A. RIDDELL　　　2,338,668
SHUTTER RELEASE
Filed Aug. 27, 1942
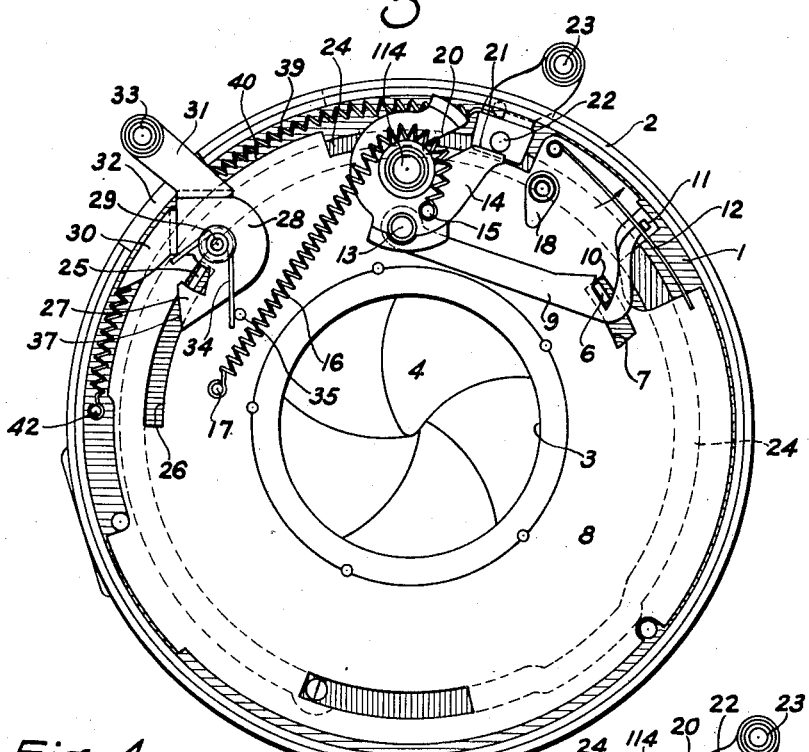
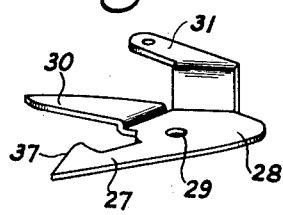
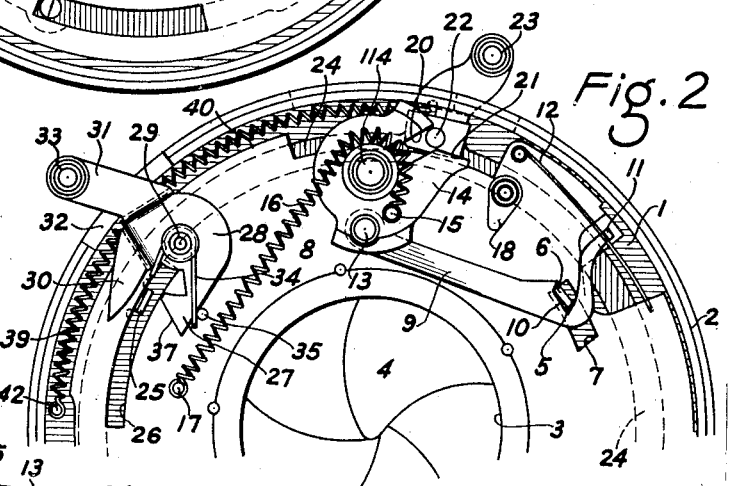
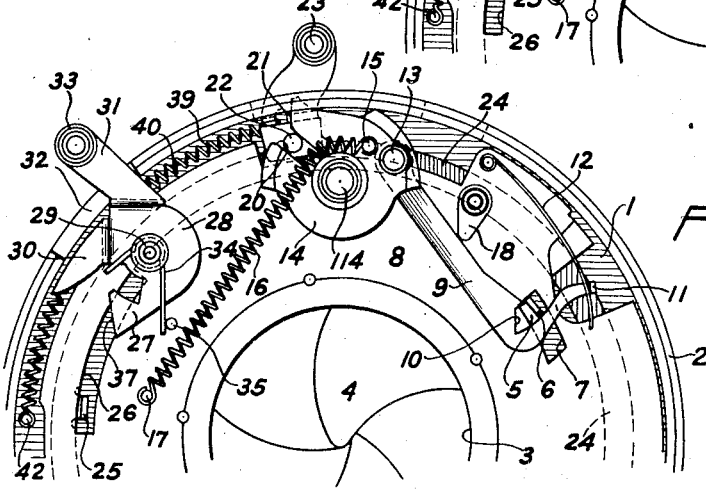
William A. Riddell
INVENTOR
BY
ATTORNEYS.

Patented Jan. 4, 1944

2,338,668

UNITED STATES PATENT OFFICE 2,338,668

SHUTTER RELEASE

William A. Riddell, Rochester, N. Y., assignor to Eastman Kodak Company, Rochester, N. Y., a corporation of New Jersey Application August 27, 1942, Serial No. 456,346

7 Claims. (Cl. 95—63)

This invention relates to photography and more particularly to photographic shutters. One object of my invention is to provide an improved form of shutter setting and releasing mechanism in which the power required to set the shutter and to release the shutter is reduced to a minimum. Another object of my invention is to provide a shutter setting and releasing mechanism in which only a small movement of the shutter trigger is necessary to release the shutter. Another object of my invention is to provide a shutter trigger structure in which the movement of the trigger requires extremely little pressure and in which the parts will function smoothly and without a tendency to jar or shake the shutter, and other objects will appear from the following specification, the novel features being particularly pointed out in the claims at the end thereof.

In most known types of shutters considerable pressure is required on the shutter trigger to release the shutter mechanism. This is much more noticeable than the so-called automatic type of shutter because in this type the trigger must first perform the function of tensioning the shutter spring and then releasing it so that it often happens that the power of the shutter spring is so great that the shutter is liable to shake at the point where the shutter trigger releases the master member.

In setting types of shutters this liability of jar upon release of the shutter is greatly reduced because the power spring is set by a setting lever and the trigger merely releases a latch which holds the setting lever and the shutter master member in a position for exposure. At the same time with certain shutters it is rather difficult to move the trigger slowly and smoothly to permit the shutter release to take place smoothly because in most shutters the shutter trigger contacts directly with the master member, which is under considerable spring tension, and for this reason occasionally considerable pressure is required on the trigger to move the latch member from a direct acting latch member on the master member.

In accordance with the present invention I have overcome some of the difficulties with setting shutters and have provided a shutter setting and releasing mechanism which works extremely smoothly and which requires a very small amount of pressure on the trigger to release the shutter.

Coming now to the drawing in which like reference characters denote like parts throughout:

Fig. 1 is a front plan view of a shutter setting and tripping mechanism in a shutter casing and with the shutter cover removed. This view shows the mechanism in a set position ready for an exposure;

Fig. 2 is a fragmentary detail plan view showing a portion of the shutter and mechanism shown in Fig. 1 with the parts in the position they assume at the start of an exposure;

Fig. 3 is a view similar to Fig. 2 but with the parts in the position they assume after an exposure has been completed; and Fig. 4 is a perspective of the shutter trigger lever removed from the camera.

In accordance with my invention I prefer to provide a shutter setting and releasing mechanism in which the trigger may be said to act indirectly upon the mechanism in that an exposure may be made by depressing the trigger, this trigger releasing a setting member which may then move under its own spring to release the shutter, the setting lever being also manually movable in an opposite direction for setting the shutter.

More specifically, my improved shutter may include a shutter casing 1, having an upstanding annular flange 2, which may support the usual shutter cover plate. The casing 1 has a central aperture 3 which is normally covered by a plurality of shutter leaves 4 which are pivotally mounted in the shutter casing in the usual manner and are pivotally connected to a blade operating ring 5 which may be moved by an upstanding lug 6 projecting upwardly through the slot 7 in the mechanism plate 8. This structure is well known and is shown in many patents, as for instance in my Patent 1,663,178, granted March 20, 1928.

The blade ring lug 6 may be engaged by a latch member 9 having a hook 10 on the end for engaging the lug and a tail 11 normally drawn by a spring 12 in the direction shown by the arrow (Fig. 1) to engage the hook 10 and the lug 6. The latch 9 is pivotally attached at 13 to a master member 14 to which there is also attached at 15 a power spring 16 connected at 17 to the mechanism plate 8.

The power spring 16 always tends to turn the master member in a counterclockwise direction and when this is done the latch member 9 rocks the blade ring 6 back and forth opening and closing the blades 4.

There is a stop member 18 attached to the mechanism plate 8 so positioned that it will cam the latch member 9 away from the lug 6 when the master member is moved in a direction to set the shutter as will appear from Fig. 3. Thus, during the setting movement, the latch rocks idly back and forth and the shutter blades remain closed. This mechanism 2 is known in the prior art and is shown in my Patent No. 2,172,295, September 5, 1939.

The master member 14 is provided with a slot 20 which is preferably radially arranged with respect to the master member and it is provided with a flat surface 21 on one side of the slot, this surface being so positioned that a pin 22 on the setting lever 23 may ride on this flat surface a short distance after the master member has been set without affecting the position of the master member. Obviously, when this pin 22 is in the position shown in Fig. 1, it will prevent the master member 14 from turning in a counter-clockwise direction to make an exposure. Thus, in this instance, the setting lever serves not only to set the master member but also to release it.

The setting lever 23 in this instance is connected to a ring-like member 24 which is mounted beneath the mechanism plate 8 so that it may oscillate freely between this plate and the shutter casing 1. This ring includes an upstanding lug 25 which projects through a slot 26 in the mechanism plate into a position in which it may be engaged by a hook-like member 27 carried by a three-armed lever 28 pivotally mounted at 29 to the mechanism plate 8. The second arm 30 of this lever may form a stop adapted to engage the upstanding periphery 2 of the shutter and the third arm 31 of this lever 28 may extend outwardly through a slot 32 in the shutter casing and may be provided with a handle 33 to constitute the trigger.

A spring 34 encircling the pivotal mount 29 and engaging a pin 35 on the mechanism plate exerts a light pressure on the three-armed lever 28 tending to turn this lever in a clockwise direction in which position the hook 27 may engage the shutter setting lever lug 25. The hook-like member also includes a beveled surface 37 so that when the lug 25 is moved from its Fig. 3 position to the Fig. 1 position the trigger may move lightly back and forth to permit the lug 25 to move to its latched position.

There is a spring 39 lying in a slot 40 in the shutter and connected to a pin 42 at one end and to the setting lever 23 at the opposite end, this spring tending to turn the setting lever in a counter-clockwise direction when the lug 25 is released from the hook 27.

The operation of the shutter releasing and setting mechanism is as follows:—

With the shutter parts in the position shown in Fig. 1 a light downward pressure on the trigger 33 against the light spring 34 moves the hook 27 from the path of the shutter setting lug 25. When this takes place the spring 39 starts the setting lever 23 and its ring 24 moving in a counter-clockwise direction causing the pin 22 to ride on the flat surface 21 until it reaches the position shown in Fig. 2. As soon as this occurs, the master member spring 16 comes into action and the master member spins about its pivot 114 as the spring 39 continues to move the blade ring in a counter-clockwise direction. As soon as the master member 14 starts to move the latch 9 rocks back and forth oscillating the blade ring lug 6 through its slot 5 causing the blades 4 to open and close. Thus, an exposure is made. While it takes a little time to describe this operation the parts move with extreme rapidity as can be easily visualized, since with a so-called No. 2 size shutter it is frequently possible to obtain an exposure of 1/400 of a second with the type mechanism described.

The setting operation of the shutter is as follows. With the parts in the position shown in Fig. 3, the lever 23 is moved in a clockwise direction. Since the latch 9 engages the stop 18 at the end of its stroke, the hook member 10 is disengaged from the blade ring lug 6 and consequently, as the master member 14 turns in a clockwise direction to wind up its spring 14, the latch 19 rocks idly back and forth. The blades 4 therefore remain closed. The spring 12 promptly engages the latch 10 with the lug 6 at the end of its setting movement as is indicated in Figs. 2 and 3. During the setting movement of the lever 23 the pin 22 rides in the slot 20 of the master member until the position shown in Fig. 2 is reached at which position the master member movement ceases although the setting lever movement may continue a short distance as the pin 22 rides along the flat or arcuate surface 21 to move to a position in which it will automatically block the operation of the shutter. During this movement the setting lever lug 25 rides through the slot 26 and causes the trigger to move back and forth as the lug engages the beveled surface 37. As soon as it lies completely behind the hook 27 the spring 34 positions the trigger in its Fig. 1 position in which it has again caught the setting lever lug 25 and is in a position to again release the shutter mechanism.

Thus, it will be seen that I have provided a shutter in which the actuation of the trigger member itself does not directly release the master member. It merely releases the master member indirectly by releasing the setting lever lug and the setting lever is permitted to start moving under the impulse of its own spring 39 before releasing the master member 14. This has a number of advantages in that it overcomes the inertia of the setting member so that the master member spring does not have to accomplish this. It provides an additional spring which assists the master member spring 16 in operating the shutter, and, perhaps most important, it provides a structure which permits an extremely light spring 34 to be used on the trigger so that an operator is working against extremely light spring pressure into pressing the trigger to release the shutter.

What I claim as new and desire to be secured by Letters Patent of the United States is:

1. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever operatively and movably engaging said master member for transmitting motion thereto in one direction for setting the shutter, latching elements on the setting lever and master member for holding the latter by the former in a set position, a releasing spring for releasing said latch automatically, a shutter trigger and means including said spring and under the control of the trigger for releasing said latch whereby said spring may release the shutter to make an exposure.

2. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever mounted to move in two directions, in one direction to set the master member and in the other direction to release said master member, an abutment on the master member, a protuberance on the setting lever positioned to engage the abutment on the master member to hold the latter in a set position, a spring for moving the setting member in a releasing direction, and a shutter trigger movably mounted and positioned to normally block the movement of the setting member in a releasing direction.

3. In a photographic shutter including an apertured casing, shutter blades pivotally mounted in the casing, a blade ring for operating the shutter blades, a master member and operative connections between the master member and the blade ring for operating the latter by the former, the combination with said master member, of a holding element carried thereby, a setting lever mounted to move in two directions, in one direction to set the master member and in the other direction to release said master member, a second holding element carried by said setting lever in position to engage the first-mentioned holding element carried by the master member to hold the master member in a set position, a spring for moving the setting member in a releasing direction, and a shutter trigger movably mounted and positioned to normally block the movement of the setting member in a releasing direction and, when moved to release the setting member whereby the spring may move the setting member to release the shutter.

4. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever mounted to move in two directions, in one direction for setting the shutter and in an opposite direction for releasing the shutter, cooperating elements on the setting lever and master member positioned to hold the latter in a set position, a shutter release spring for moving the setting member in a releasing direction, and a shutter trigger movably mounted in the shutter casing and opposing movement of the setting member in a releasing direction, and a handle for moving the trigger from its position opposing movement of the setting member whereby the shutter release spring may release the shutter.

5. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever mounted to move in two directions, in one direction for setting the shutter and in an opposite direction for releasing the shutter, cooperating elements carried by the setting lever and the master member and positioned to retain the master member in a set position, a shutter release spring for moving the setting member in a releasing direction, and a shutter trigger movably mounted in the shutter casing and opposing movement of the setting member in a releasing direction, said trigger including a pivoted hook normally extending across the path of movement of the setting lever, said hook being manually movable from said path whereby the releasing spring may release the shutter to make an exposure.

6. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever movably mounted on the casing, said lever slidably engaging the master member to set said member through said sliding movement, and a latch included in said master and setting members for holding the former in a set position, a power spring for moving the setting lever toward an inoperative position in which the master member is not set, and a shutter trigger including a protuberance, an extension on the setting lever extending into the path of the protuberance to engage and be held thereby in an operative or set position against the tension of the spring, said trigger protuberance being movable with the trigger to release the setting member whereby the spring may move the setting member to release the master member for exposure.

7. In a photographic shutter including an apertured casing, shutter blades pivotally mounted in the casing, a blade ring for operating the shutter blades, a master member and operative connections between the master member and the blade ring for operating the latter by the former, the combination with said master member, of a setting lever movably mounted on the casing, said lever slidably engaging the master member to set said member through said sliding movement, and a latch included in said master and setting members for holding the former in a set position, a power spring for moving the setting lever toward an inoperative position in which the master member is not set, a protuberance on the setting lever to move with the setting lever through an arcuate path, a pivoted shutter trigger, a hook carried thereby and adapted for movement to and from the path of the protuberance and in one position to hold the protuberance against movement, the shutter trigger being pivoted substantially on the arcuate path of the protuberance, whereby the force of the releasing spring on the protuberance does not react on the trigger, and a handle on the trigger for moving the hook from the protuberance to release the protuberance whereby the releasing spring may release the shutter.

WILLIAM A. RIDDELL.